United States Patent
Storm et al.

(10) Patent No.: US 11,120,111 B2
(45) Date of Patent: Sep. 14, 2021

(54) AUTHENTICATION BASED ON CORRELATION OF MULTIPLE PULSE SIGNALS

(71) Applicant: Advanced New Technologies Co., Ltd., George Town (KY)

(72) Inventors: Gregory Lee Storm, Parkville, MO (US); Reza R. Derakhshani, Shawnee, KS (US)

(73) Assignee: Advanced New Technologies Co., Ltd., Grand Cayman (KY)

( * ) Notice: Subject to any disclaimer, the term of this patent is extended or adjusted under 35 U.S.C. 154(b) by 219 days.

(21) Appl. No.: 16/216,862

(22) Filed: Dec. 11, 2018

(65) Prior Publication Data

US 2020/0184055 A1  Jun. 11, 2020

(51) Int. Cl.
*G06F 21/32*    (2013.01)
*G06F 21/60*    (2013.01)
(Continued)

(52) U.S. Cl.
CPC ............ *G06F 21/32* (2013.01); *G06F 21/604* (2013.01); *H04L 9/3231* (2013.01);
(Continued)

(58) Field of Classification Search
None
See application file for complete search history.

(56) References Cited

U.S. PATENT DOCUMENTS

| 8,902,045 B1 * | 12/2014 | Linn | G06K 9/00288 |
| | | | 340/5.83 |
| 10,643,057 B2 * | 5/2020 | Shadd | A61B 5/489 |

(Continued)

FOREIGN PATENT DOCUMENTS

| CN | 107851182 | 3/2018 |
| WO | WO 2016204968 | 12/2016 |

OTHER PUBLICATIONS

Bakhtiari et al., "A real-time heart rate analysis for a remote millimeter wave I-Q sensor," IEEE Transactions on Bio-Medical Engineering, Jun. 2011, 58(6): 1839-1845.
(Continued)

*Primary Examiner* — Benjamin E Lanier
(74) *Attorney, Agent, or Firm* — Fish & Richardson P.C.

(57) ABSTRACT

Techniques are described for user authentication based on correlation of multiple pulse signals that each describe an independently determined pulse pattern for an individual. Different measurements of an individual's pulse can be generated in response to a request from the individual to access a computing system, such as a kiosk. The different measurements can be generated independently of one another using different types of sensor devices. For example, a measurement can be made using a radar sensor to detect movements caused by the user's pulse, and another measurement can be made through analysis of video data. If the independently generated pulse patterns are sufficiently similar to each other (e.g., determined using machine learning or other techniques), a determination may be made that the individual is not attempting to spoof another individual, and access to the computing system can be granted based at least partly on the determination.

15 Claims, 5 Drawing Sheets

(51) Int. Cl.
*H04L 9/32* (2006.01)
*G06K 9/00* (2006.01)

(52) U.S. Cl.
CPC ..... *G06K 9/00536* (2013.01); *G06K 9/00892* (2013.01); *G06K 9/00899* (2013.01); *G06K 2009/00939* (2013.01)

(56) References Cited

U.S. PATENT DOCUMENTS

| | | |
|---|---|---|
| 2003/0135097 A1* | 7/2003 | Wiederhold ....... A61B 5/02055 600/301 |
| 2015/0040203 A1* | 2/2015 | Qian ................. H04W 12/0605 726/7 |
| 2015/0264567 A1* | 9/2015 | Sensharma .............. G06K 9/22 455/411 |
| 2016/0371555 A1 | 12/2016 | Derakhshani et al. |
| 2017/0172424 A1* | 6/2017 | Eggers ................... G16H 50/20 |
| 2017/0357868 A1 | 12/2017 | Derakhshani et al. |
| 2018/0096119 A1* | 4/2018 | Yun ...................... A61B 5/0077 |
| 2018/0140228 A1* | 5/2018 | Olivier ............... G06K 9/00536 |

OTHER PUBLICATIONS

Bush, "Measuring Heart Rate from Video," Stanford Computer Science, 2016, 8 pages.

* cited by examiner

AUTHENTICATION BASED ON CORRELATION OF MULTIPLE PULSE SIGNALS

BACKGROUND

Various types of software applications enable users to access information and/or perform actions that may affect the state of a local or remote computing system. In some examples, software may perform authentication and/or authorization operations to verify the identity of the user and/or ensure that the user is authorized to access information and/or perform actions through the software executing on a local and/or remote device. For example, a user may be prompted to enter credential(s) such as a username, password, personal identification number (PIN), and so forth, and such credential(s) may be compared to previously established credential(s) to verify the user's identity and/or authorization. In some examples, biometric data may be used in addition to or instead of user-entered credential(s), to attempt to verify the user's identity based on one or more of their physiological characteristics. Previously available methods for authenticating a user have been vulnerable to different types of exploits, given the strong incentives for malicious individuals to attempt unauthorized access, for example to view confidential information or commit fraud.

SUMMARY

Implementations of the present disclosure are generally directed to user authentication in computing systems. More particularly, implementations of the present disclosure are directed to performing multiple, independent measurements of the pulse of an individual using different measurement techniques, and correlating the different pulse measurements to determine that the individual is not engaging in a spoofing attack to impersonate another individual in an attempt to gain unauthorized access to a computing system (e.g., a public kiosk) and/or data stored thereon. Implementations may operate to prevent or reduce the success rate of a spoofing attack in which a malicious individual attempts to spoof the identity of an authorized user, and fool an image-based authentication system (e.g., facial recognition), by presenting still image(s) and/or replayed video of the authorized user to the image-based authentication system.

In general, innovative aspects of the subject matter described in this specification can be embodied in methods that include the following operations: accessing first sensor data generated by a first sensor device that is at a fixed location in proximity to a kiosk, the first sensor data describing at least one first physiological characteristic of an individual; accessing second sensor data generated by a second sensor device in proximity to the kiosk, the second sensor data generated independently of the first sensor data, the second sensor data describing at least one second physiological characteristic of the individual, wherein the first sensor data and the second sensor data are accessed in response to a request of the individual to access information through the kiosk; analyzing the first sensor data to determine a first pulse pattern that describes a pulse of the individual; analyzing the second sensor data to determine a second pulse pattern that describes the pulse of the individual; and determining a degree of correspondence between the first pulse pattern and the second pulse pattern and, based at least partly on the degree of correspondence, determining a result of the request of the individual to access information through the kiosk.

These and other implementations can each optionally include one or more of the following features: the first sensor device is at least one of a radar sensor device, a laser Doppler measurement device, and a laser vibrometer; the first sensor data indicates movement of at least one body part of the individual, the movement associated with the pulse of the individual; analyzing the first sensor data includes extracting the first pulse pattern based on the movement indicated in the first sensor data; the second sensor device is a camera; the second sensor data includes video of at least one body part of the individual; analyzing the second sensor data includes analyzing the video to determine the second pulse pattern based on one or more of a movement and a skin color fluctuation shown in the video; the determined result is a denial of access to the kiosk, based on an absence of the pulse in at least one of the first pulse pattern and the second pulse pattern; the determined result is a denial of access to the kiosk based on a difference, between the first pulse pattern and the second pulse pattern, in one or more of a frequency and a time offset of the pulse; the determined result is a grant of access to the kiosk based on the first pulse pattern being within a threshold degree of similarity to the second pulse pattern in both a frequency and a time offset of the pulse; one or more of the first sensor device and the second sensor device is a component of the kiosk; the second sensor device is a component of a wearable computing device worn by the individual; analyzing one or more of the first sensor data and the second sensor data includes providing the one or more of the first sensor data and the second sensor data as input to at least one classifier that is trained, using at least one machine learning (ML) algorithm, to output a pulse pattern based on input sensor data; and/or the at least one classifier includes one or more of a neural network, a recurrent neural network (RNN), a long short-term memory (LSTM) network, and a support vector machine (SVM).

These and other implementations can provide one or more of the following technical advantages and/or technical improvements compared to traditional authentication techniques. By performing multiple, independent measurements of an individual's pulse as part of the authentication of an individual, implementations can prevent an unauthorized individual from successfully performing a spoofing attack on an image-based authentication system (e.g., for face, eye, or body recognition), by presenting still image(s) or replayed video showing an authorized individual. In this way, implementations improve the operation of a computing system that performs user authentication and/or authorization operations, by providing a more reliable technique for authenticating a user and hardening the computing system against spoofing attacks.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
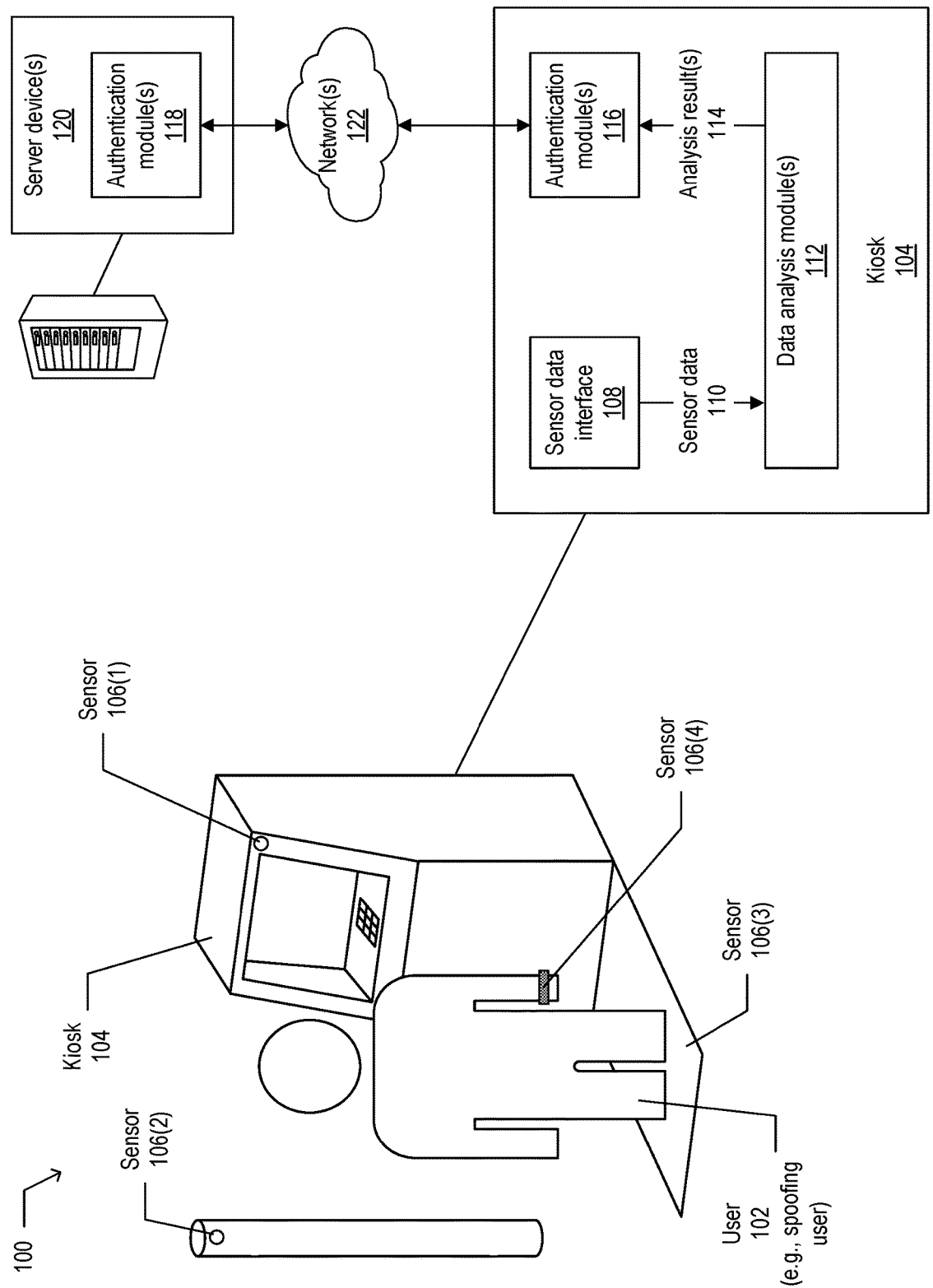
FIG. 1 depicts an example system for user authentication, according to implementations of the present disclosure.

Implementations of the present disclosure are directed to systems, devices, methods, and computer-readable media for user authentication based on correlation of multiple pulse signals that each describe an independently determined pulse pattern for an individual. Different measurements of an individual's pulse can be generated in response to a request from the individual to access a computing system, such as a kiosk. The different measurements can be generated independently of one another using different types of sensor devices. For example, one measurement can be made using a radar sensor to detect small movements caused by the user's pulse, and another measurement can be made through analysis of video data (e.g., to identify movements and/or blushing of the user) collected by camera(s). If the independently generated pulse patterns are sufficiently similar to each other (e.g., within a threshold measure of similarity and/or as determined using machine learning (ML) or other techniques), a determination may be made that the individual is not attempting a spoofing attack by impersonating another individual, and access to the computing system can be granted (e.g., if facial recognition and/or other authentication mode(s) are satisfied). If the independently generated pulse patterns are not similar, such that the patterns show a different frequency, time offset, or other differences in the waveforms, access to the computing system can be denied. In the latter instance, a measurement of different pulse patterns for the individual may lead to an inference that the individual is attempting a spoofing attack on an image-based authentication system, impersonating another, authorized, user by presenting previously captured video data of the authorized user. Similarly, if one of the individually measured pulse patterns shows no pulse detected, an inference may be made that the individual is attempting a spoofing attack by presenting still image(s) of the authorized user to attempt to fool the image-based authentication system.

An image-based authentication system may be any suitable system that attempts to verify the identify of a user based on image(s) (e.g., still image(s) and/or video) of the user, such as image(s) of the user's face, eye(s), whole body, and/or other portion(s) of the body. For example an image-based authentication may include capturing an image of the user's face and comparing certain points on the face image (e.g., location of eyes, mouth, nose, etc.), and/or the image as a whole, with previously gathered information regarding the user, to determine whether the image is actually that of the user. Image-based authentication can be used to secure access to sensitive data, such as financial information, health information, and/or other information that is to be inaccessible by the general public. The authentication can also be used to secure access to an application or service that would enable a user to request transactions (e.g., funds transfers, purchases, etc.). Accordingly, implementations described herein help strengthen an image-based authentication system and prevent sensitive data from being accessed by unauthorized individuals, and/or prevent fraud, theft, or other malicious acts.

In some implementations, the authentication techniques described herein operate to secure access to secure information and/or operations that are provided through a kiosk and/or through some other computing device (e.g., smartphone, tablet computer, wearable computer, etc.). As used herein, a kiosk refers to any suitable type of computing device and/or communications interface that is at (e.g., publicly) accessible by multiple individuals. For example, a kiosk can be an automated teller machine (ATM) that different individuals can access to view financial information, make deposits or withdrawals, request funds transfers, and so forth. As another example, a kiosk can be a vending machine or retail sales device that different individuals can access to purchase products or services of any suitable type. Implementations described herein may harden a kiosk against spoofing attacks, and reduce the risk of fraud or theft that may be committed through such kiosks by way of a user-impersonation type spoofing attack.

In some implementations, a radar sensor device (e.g., millimeter wave and/or ultra-wide band (UWB)) can collect sensor data used for a first determination of an individual's pulse pattern, and video camera(s) (e.g., visible light and/or multispectral) can collect a different set of sensor data used for a second determination of the individual's pulse pattern. A correlation between the two pulse patterns may be used to determine that the two sensor devices are monitoring the same individual with the same pulse, and verify that the individual is not engaged in a spoofing attack, and this determination can provide greater confidence to an authentication of the individual through an image-based authentication system. If there is an anomaly, such as the pulse being absent from either determined pulse pattern (e.g., as in the case of an attacker employing a 3-D mask presenting image(s) of an authorized user over the attacker's face), or the pulse being is out of sync in the different pulse patterns (e.g., as in a video replay attack), a determination may be made that a spoofing attempt is underway. In some implementations, the system can analyze the periodicity of the signals received and determine a probability that the pulse patterns are from the same source, using suitable statistical analysis and/or ML technique(s), and a spoof detection score can be determined from this analysis. The score can be used (e.g., by itself) to determine whether to allow or deny access to the kiosk. In some examples, the score can be used in conjunction with an authentication determination made by an image-based authentication system (or other authentication mechanism(s)), to determine whether to grant access.

Although examples herein describe controlling access to a kiosk based on sensor data from sensor(s) (e.g., radar and/or laser sensor) mounted on the kiosk, compared to data from a camera that is also mounted on the kiosk in nearby, implementations are not limited to these examples. In some implementations, other sources of sensor data may be employed. For example, heart rate information captured using a wearable user device (e.g., wristwatch computer, ring-based device, fitness tracking device, sensor(s) embedded in clothing, headphones or earbuds with sensor(s), etc.) can be compared to images taken using a camera of a smartphone or other device to determine whether a spoof is in progress.

FIG. 1 depicts an example system 100 for user authentication, according to implementations of the present disclosure. In the example of FIG. 1, a user 102 is requesting access to a kiosk 104. In some instances, the user 102 may be attempting to impersonate another user, e.g., an authorized user, to improperly gain access to and/or use of the other user's account information or other sensitive information that may be accessed through the kiosk 104. The kiosk 104 may employ an image-based authentication system to authenticate users, and provide access to the kiosk 104 for those users whose identity is verified based on the image-based authentication system (e.g., through facial recognition, retina scan, etc.).

In some implementations, multiple measurements of the user's pulse may be generated and correlated as an additional safeguard against spoofing attacks. The pulse measurements may be made using sensor data 110 that is collected by one or more sensor devices 106 in proximity to the kiosk 104 and the user 102. The sensor devices 106 may also be described as sensors 106. In some examples, the sensors 106 are fixed in their location relative to the kiosk 104. Such sensors 106 can include sensors that are components of the kiosk 104 itself, as with the example of sensor 106(1) shown in FIG. 1, and/or sensors that are separate from the kiosk 104 and in proximity to the kiosk 104, such as the example of sensor 106(2). The sensors can include a sensor 106(3) that is arranged in a pad or other component (e.g., an active floor) that the user 102 would stand on while interacting with the kiosk 104. The sensors can also include sensor(s) 106(4) that are worn and/or carried by the user 102. Such sensor(s) 106(4) can include any suitable device that is configured to measure the pulse of the user 102 while being worn or carried, including but not limited to: wearable devices, such as a fitness tracker, virtual or augmented reality headset, smart earbuds or headphones, a medical monitoring device, and so forth; and/or other portable computing devices, such as a smartphone, tablet computer, and so forth.

In some implementations, the sensor(s) 106 can include at least one radar sensor that employs millimeter wave radar, UWB radar, and/or other suitable radar technology to measure (e.g., small) movements of one or more body parts of the user 102. For example, the movements may be small movements of the user's head, skin, or other parts caused by the user's pulse. In some implementations, the sensor(s) 106 can include a laser Doppler type sensor and/or a laser vibrometer configured to measure such movements. The sensor(s) 106 can generate any suitable amount and/or format of sensor data 110.

The sensor(s) 106 can also include one or more cameras configured to capture sensor data 110 that includes video of the user 102. The video data can be analyzed to determine the pulse pattern for the user 102, based on movements of the head, movements of the skin (e.g., near an artery), periodic flushing and/or color change in the skin, and/or other discernible effects of the pulse on the user's appearance. The camera(s) may generate video data by capturing scenes in the field of view of the camera(s). The video data generated by the camera(s) may include video of any suitable length and format.

The sensor data 110 generated by the various sensor device(s) 106 can be received through a sensor data interface 108 in the kiosk 104, and provided to data analysis module(s) 112 executing on the kiosk 104 or elsewhere. The module(s) 112 can perform various operations to analyze the sensor data 110 and, based on the analysis, generate analysis result(s) 114. In some implementations, the analysis module(s) 112 can analyze different sets of sensor data 110 to determine multiple pulse patterns for the user 102. A pulse pattern can be a waveform (or a description of a waveform) that indicates the pulse of the user. A pulse of the user 102 can also be described as a heart rate of the user 102. For example, in instances where the sensor data 110 includes video data, the module(s) 112 can analyze the video data to determine the pulse pattern based on periodic movements (e.g., of skin and/or head) and/or a periodic color change (e.g., flushing) caused by the user's pulse. As another example, in instances where the sensor data 110 includes data generated by radar sensors, laser Doppler sensors, laser vibrometers, and/or the active floor, the analysis module(s) 112 can analyze the data to identify periodic movements that are exhibited by the sensor data 110, where such movements can be caused by the user's pulse.

The analysis module(s) 112 can also compare the various pulse patterns that are determined based on the various sets of sensor data 110 from each sensor 106. The comparison, also described as a correlation, can determine whether the pulse patterns are sufficiently similar (e.g., within a threshold measure of similarity), indicating that the pulse patterns reflect the pulse of the same user 102 measured simultaneously. Differences in the pulse patterns, and/or the absence of a detectable pulse in any of the data, can indicate that the user 102 is attempting a spoofing attack. In some implementations, the analysis module(s) 112 can generate a score that indicates a likelihood that a spoofing attack is in progress, based on the comparison of the pulse patterns. The analysis result(s) 114 can include the score and/or the pulse patterns.

In some implementations, the analysis result(s) 114 can be provided to authentication module(s) 116 executing on the user device 104. The authentication module(s) 122 can determine whether the user 102 is to be granted access to the kiosk 104, based on the analysis result(s) 114. In some implementations, the analysis result(s) 114 are communicated over one or more networks 122 to server device(s) 120 that are remote from the kiosk 104, and the determination of whether to grant access can be made by authentication module(s) 118 executing on the server device(s) 120. The server device(s) 120 may include any suitable number and type of computing device(s). In either scenario, the module(s) 116 and/or 118 can be part of an image-based authentication system that performs operations to authenticate users based on facial recognition, eye recognition (e.g., retinal scan), fingerprint recognition, gait recognition, and/or recognition of other body parts. The analysis result(s) 114 may be taken into account in performing the image-based authentication.

In some examples, the data analysis module(s) 112 may execute on the server device(s) 120 and perform the analysis based on the sensor data 110 that is communicated to the server device(s) 120 over the network(s) 122. The result of the determination whether to grant access may then be communicated to the kiosk 104 from the server device(s) 120. The analysis of the sensor data 110 can be performed on one or both of the kiosk 104 and the server device(s) 120.

In some implementations, the analysis result(s) 114 may be used by the authentication module(s) 116 and/or 118 to determine whether the image-based authentication is to be performed based on collected image(s) (or video) of the user 102. For example, if the analysis result(s) 114 indicates a probability of spoofing attack that is higher than a predetermined threshold value (e.g., at least 80%), the access request may be denied without performing the image-based authentication determination. In this way, the analysis result(s) 114 can be used for an initial determination of whether to proceed with the image-based analysis.

In some implementations, the analysis result(s) 114 can be used in conjunction with the image-based analysis to determine authentication, and the result of that analysis may be modified based on the analysis result(s) 114. For example, the image-based analysis may be performed (e.g., by the module(s) 116 and/or 118), with a result that the user's identity is verified with X % confidence. The analysis result(s) 114 (e.g., based on comparison of independently generated pulse patterns) can be used to raise (e.g., if a monitor is not present) or lower (e.g., if a monitor is present) that result.

Figure 2:
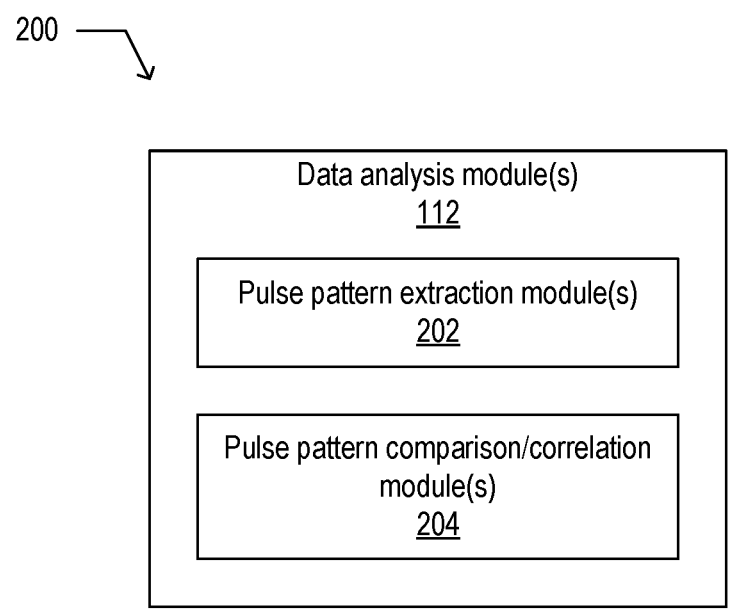
FIG. 2 depicts an example of data analysis module(s) for user authentication, according to implementations of the present disclosure.

FIG. 2 depicts an example 200 of data analysis module(s) 112 that may be employed for user authentication, according to implementations of the present disclosure. In some implementations, the module(s) 112 include pulse pattern extraction module(s) 202 that determine a pulse pattern based on a set of sensor data 110. As described above, a particular module 202 can be configured to extract a pulse pattern from a particular set of sensor data 110 generated by a particular type of sensor 106. For example, a module 202 can analyze video data, another module 202 can analyze radar data, and so forth. The module(s) 112 can also include pulse pattern comparison/correlation module(s) 204 that perform a comparison of the different pulse patterns generated by the various module(s) 202, and output a score indicating similarity of the pulse patterns and/or likelihood of spoofing attack as described above.

The analysis can also use suitable techniques of signal processing to determine the pulse pattern based on the sensor data 110. For example, in the analysis of video data, a suitable image stabilization technique can be used prior to further analysis. The analysis can focus on those portion(s) of the user's face that are particularly suited for extracting pulse information (e.g., cheeks). In some examples, sensor data 110 can be pre-processed to filter out data that indicates pattern frequencies outside of the frequency range of a typical pulse. Analysis may look for peaks in the waveforms, and determine distance between the peaks, to determine a period (and therefore frequency) of the waveform.

In some implementations, the analysis of the sensor data 110 and/or comparison of pulse patterns can employ one or more suitable ML techniques. In some examples, the pulse pattern extraction module(s) 202 can include one or more classifiers that are trained using suitable ML techniques, as described further herein. The classifier(s) may each generate a prediction of a pulse pattern based on a particular type (e.g., source sensor device) of sensor data 110.

In some implementations, training data may be generated and provided as input to train (or retrain) the classifier(s). The training data can include sensor data that is collected, from the various types of sensors 106, and that is associated with a measured pulse of the users from which the sensor data is collected. The measured pulse for the training data can be a pulse that is captured using any suitable device for (e.g., directly) measuring the pulse of an individual, such as an electrocardiogram (ECG).

Any suitable ML technique(s) may be used to develop the classifier(s). For example, classifier(s) may be developed as a neural network, such as a recurrent neural network (RNN). In some instances, the classifiers may include RNN(s) that employ long short-term memory (LSTM) units for pattern recognition. Such RNN(s) may also be described as LSTM network(s). As another example, the classifier(s) may include support vector machine(s) (SVM(s)), or employ other suitable ML techniques. The classifier(s) may be trained using training data that includes feature vectors of the various types of sensor data 110 to be used in the analysis, labeled with independently measured pulse patterns. Having been thus trained, the classifier(s) may predict a pulse pattern based on input feature vectors. Alternatively, the classifier(s) may be trained to output a prediction of whether a spoofing attack is in progress. Implementations support retraining of the classifier(s) on a periodic and/or ongoing basis, to refine the operation of the classifier(s) to produce more reliable predictions.

Implementations may employ suitable deep learning techniques, and/or suitable shallow learning techniques. In either case, the training of the classifiers may be data driven. The training may use feature vectors for positive examples, such as staged spoofing attacks with different types of sensor data collected. The training may also use feature vectors for negative examples, in which a spoofing attack is not in progress.

Figure 3:
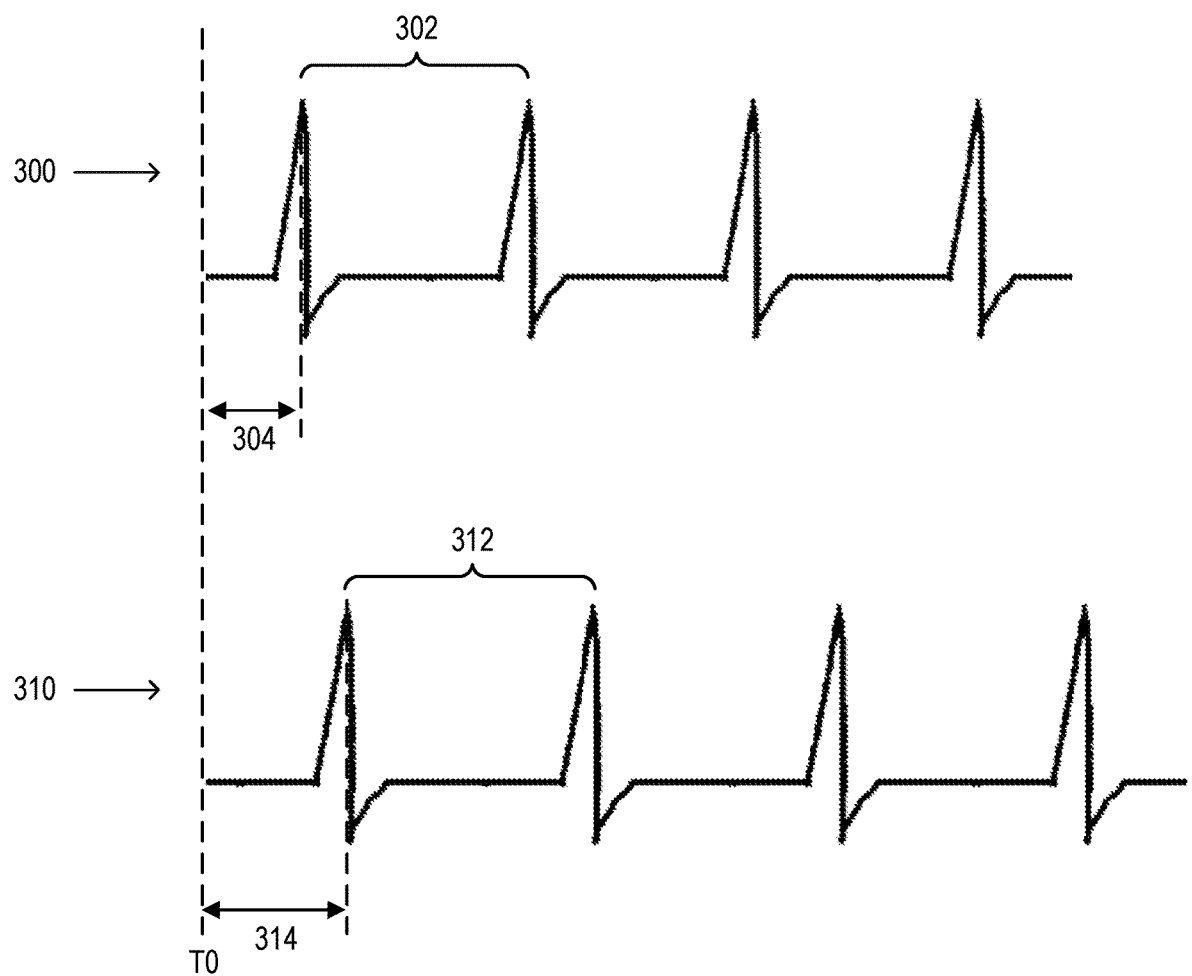
FIG. 3 depicts example pulse patterns employed in user authentication, according to implementations of the present disclosure.

FIG. 3 depicts example pulse patterns employed in user authentication, according to implementations of the present disclosure. In the example of FIG. 3, two pulse patterns 300 and 310 are compared to determine whether a spoofing attack is in progress. Although examples herein describe independently generating and comparing two pulse patterns, implementations support the generation and comparison of any suitable number of pulse patterns. The particular waveforms in FIG. 3 are examples, and are not limiting of the particular waveforms that can be generated and analyzed by the implementations described herein.

In this example, the first pulse pattern 300 has a period 302 and a time offset 304, and the second pulse pattern 310 has a period 312 and a time offset 314, the time offset being a particular time of a feature of the waveforms relative to a reference time (e.g., TO in the figure). A difference in either the period (or frequency) or the time offset of the different waveforms may be used as the basis to determine that the pulse patterns are different and that a spoofing attack may be in progress. Other differences in the pulse patterns may also be identified, such as differences in the waveforms themselves (e.g., different number and size of peaks, troughs, and/or other features). In some examples, a (e.g., statistical) comparison of the different pulse patterns may be performed to generate a score that indicates the degree of similarity (or difference) between the pulse patterns. ML technique(s) can also be deployed to determine the degree of similarity between the pulse patterns, as described herein.

Figure 4:
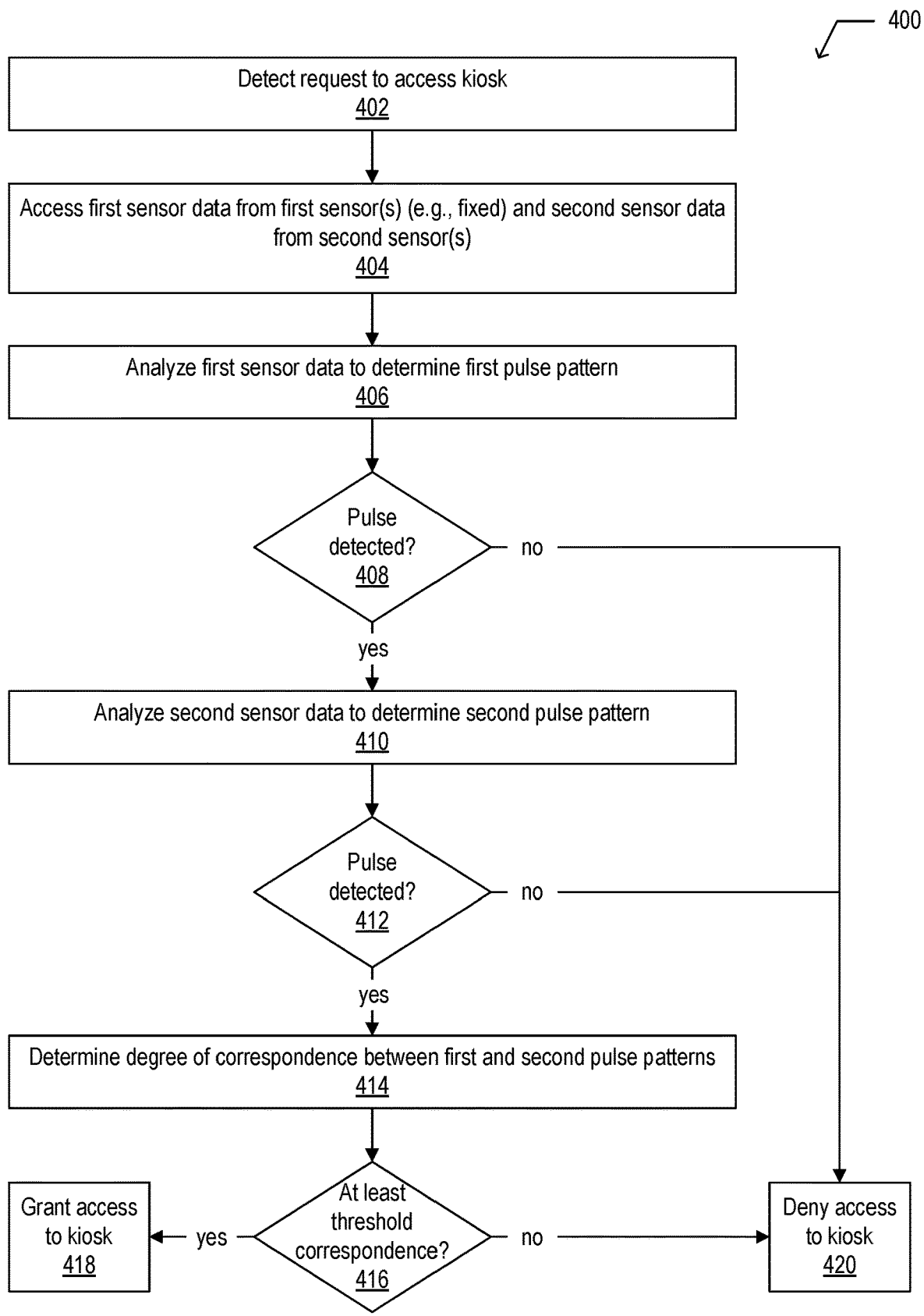
FIG. 4 depicts a flow diagram of an example process for user authentication, according to implementations of the present disclosure.

FIG. 4 depicts a flow diagram 400 of an example process for user authentication, according to implementations of the present disclosure. Operations of the process may be performed by one or more of the data analysis module(s) 112, the authentication module(s) 116, the authentication module(s) 118, and/or other software module(s) executing on the kiosk 104, the server device(s) 120, or elsewhere.

In some implementations, a request to access the kiosk is detected (402), and the process may proceed in response to that event. A first set and a second set of sensor data can be accessed 404. The first set of sensor data can be generated by a first set of sensor(s) (e.g., of a first type), and the second set of sensor data can be generated by a second set of sensor(s) (e.g., of a second, different type). In some examples, the first set of sensor(s) are sensor(s) with a fixed location relative to the kiosk 104.

The first sensor data can be analyzed (406) to determine a first pulse pattern for the user 102. If no pulse is detected (408) as exhibited in the first pulse pattern, the process may proceed to deny the request to access (420) the kiosk.

The second sensor data can be analyzed (410) to determine a second pulse pattern for the user 102. If no pulse is detected (412) as exhibited in the second pulse pattern, the process may proceed to deny the request to access (420) the kiosk.

If both pulse patterns show a pattern that can be discerned as a human pulse, the process may proceed to determine (414) a degree of correspondence between the first and second pulse patterns. If there is at least a threshold correspondence between the first and second pulse patterns (e.g., 416), the access may be granted (418). If not, the access may be denied (420).

Figure 5:
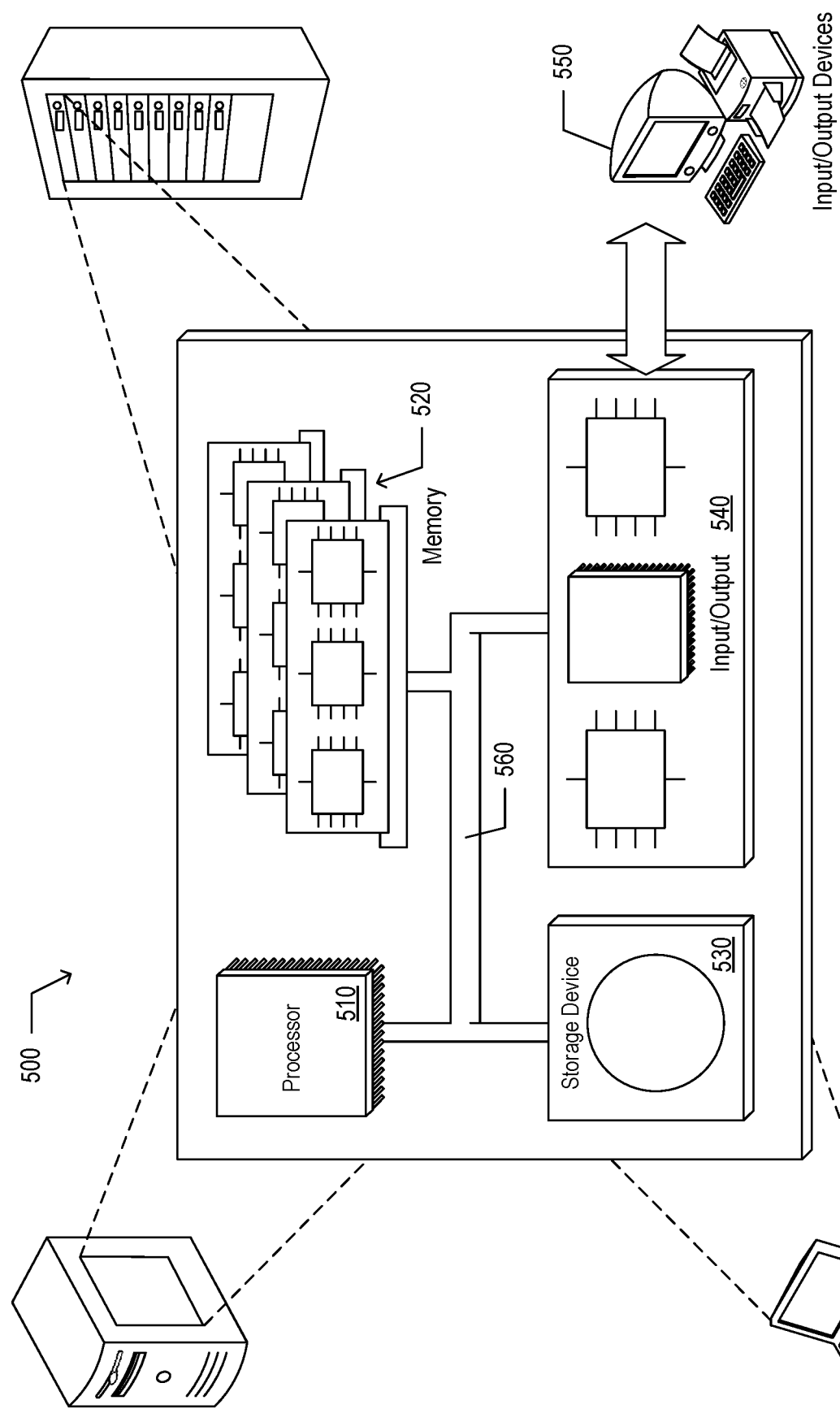
FIG. 5 depicts an example computing system, according to implementations of the present disclosure.

FIG. 5 depicts an example computing system, according to implementations of the present disclosure. The system 500 may be used for any of the operations described with respect to the various implementations discussed herein. For example, the system 500 may be included, at least in part, in one or more of the user device 104, the server device(s) 126, and/or other computing device(s) and system(s) described herein. The system 500 may include one or more processors 510, a memory 520, one or more storage devices 530, and one or more input/output (I/O) devices 550 controllable via one or more I/O interfaces 540. Two or more of the components 510, 520, 530, 540, or 550 may be interconnected via at least one system bus 560, which may enable the transfer of data between the various modules and components of the system 500.

The processor(s) 510 may be configured to process instructions for execution within the system 500. The processor(s) 510 may include single-threaded processor(s), multi-threaded processor(s), or both. The processor(s) 510 may be configured to process instructions stored in the memory 520 or on the storage device(s) 530. The processor(s) 510 may include hardware-based processor(s) each including one or more cores. The processor(s) 510 may include general purpose processor(s), special purpose processor(s), or both.

The memory 520 may store information within the system 500. In some implementations, the memory 520 includes one or more computer-readable media. The memory 520 may include any number of volatile memory units, any number of non-volatile memory units, or both volatile and non-volatile memory units. The memory 520 may include read-only memory, random access memory, or both. In some examples, the memory 520 may be employed as active or physical memory by one or more executing software modules.

The storage device(s) 530 may be configured to provide (e.g., persistent) mass storage for the system 500. In some implementations, the storage device(s) 530 may include one or more computer-readable media. For example, the storage device(s) 530 may include a floppy disk device, a hard disk device, an optical disk device, or a tape device. The storage device(s) 530 may include read-only memory, random access memory, or both. The storage device(s) 530 may include one or more of an internal hard drive, an external hard drive, or a removable drive.

One or both of the memory 520 or the storage device(s) 530 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 500. In some implementations, the CRSM may include a data store that provides storage of computer-readable instructions or other information in a non-transitory format. The CRSM may be incorporated into the system 500 or may be external with respect to the system 500. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 510 and the memory 520 may be supplemented by, or incorporated into, one or more application-specific integrated circuits (ASICs).

The system 500 may include one or more I/O devices 550. The I/O device(s) 550 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 550 may also include one or more output devices such as a display, LED(s), an audio output device (e.g., a speaker), a printer, a haptic output device, and so forth. The I/O device(s) 550 may be physically incorporated in one or more computing devices of the system 500, or may be external with respect to one or more computing devices of the system 500.

The system 500 may include one or more I/O interfaces 540 to enable components or modules of the system 500 to control, interface with, or otherwise communicate with the I/O device(s) 550. The I/O interface(s) 540 may enable information to be transferred in or out of the system 500, or between components of the system 500, through serial communication, parallel communication, or other types of communication. For example, the I/O interface(s) 540 may comply with a version of the RS-232 standard for serial ports, or with a version of the IEEE 1284 standard for parallel ports. As another example, the I/O interface(s) 540 may be configured to provide a connection over Universal Serial Bus (USB) or Ethernet. In some examples, the I/O interface(s) 540 may be configured to provide a serial connection that is compliant with a version of the IEEE 1394 standard.

The I/O interface(s) 540 may also include one or more network interfaces that enable communications between computing devices in the system 500, or between the system 500 and other network-connected computing systems. The network interface(s) may include one or more network interface controllers (NICs) or other types of transceiver devices configured to send and receive communications over one or more networks using any network protocol.

Computing devices of the system 500 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 500 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, such as one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations.

Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method performed by at least one processor, the method comprising:
    accessing, by the at least one processor, first sensor data generated by a first sensor device that is included in a kiosk, the first sensor data describing at least one first physiological characteristic of an individual;
    accessing, by the at least one processor, second sensor data generated by a second sensor device in proximity to the kiosk, the second sensor device included in a wearable device worn or carried by the individual, the second sensor data generated independently of the first sensor data, the second sensor data describing at least one second physiological characteristic of the individual, wherein the first sensor data and the second sensor data are accessed in response to a request of the individual to access information through the kiosk;
    providing, by the at least one processor, the first sensor data as input to a first classifier that is trained to predict pulse patterns based on a type of the first sensor device, and obtaining a first pulse pattern as output of the first classifier;
    providing, by the at least one processor, the second sensor data as input to a second classifier, different from the first classifier, that is trained to predict pulse patterns based on a type of the second sensor device, and obtaining a second pulse pattern as output of the second classifier; and
    determining, by the at least one processor, a degree of correspondence between the first pulse pattern and the second pulse pattern and, based at least partly on the degree of correspondence, determining a result of the request of the individual to access information through the kiosk.

2. The method of claim 1, wherein:
    the first sensor device is at least one of a radar sensor device, a laser Doppler measurement device, and a laser vibrometer;
    the first sensor data indicates movement of at least one body part of the individual, the movement associated with a pulse of the individual; and
    analyzing the first sensor data includes extracting the first pulse pattern based on the movement indicated in the first sensor data.

3. The method of claim 1, wherein:
    the first sensor device is a camera;
    the first sensor data includes video of at least one body part of the individual; and
    analyzing the first sensor data includes analyzing the video to determine the first pulse pattern based on one or more of a movement and a skin color fluctuation shown in the video.

4. The method of claim 1, wherein the determined result is a denial of access to the kiosk, based on an absence of a pulse in at least one of the first pulse pattern and the second pulse pattern.

5. The method of claim 1, wherein the determined result is a denial of access to the kiosk based on a difference, between the first pulse pattern and the second pulse pattern, in one or more of a frequency and a time offset of a pulse.

6. The method of claim 1, wherein the determined result is a grant of access to the kiosk based on the first pulse pattern being within a threshold degree of similarity to the second pulse pattern in both a frequency and a time offset of a pulse.

7. The method of claim 1, wherein the first classifier and the second classifier include one or more of a neural network, a recurrent neural network (RNN), a long short-term memory (LSTM) network, or a support vector machine (SVM).

8. A system comprising:
    at least one processor; and
    a non-transitory memory communicatively coupled to the at least one processor, the non-transitory memory storing instructions which, when executed, cause the at least one processor to perform operations comprising:
        accessing first sensor data generated by a first sensor device that is included in a kiosk, the first sensor data describing at least one first physiological characteristic of an individual;
        accessing second sensor data generated by a second sensor device in proximity to the kiosk, the second sensor device included in a wearable device worn or carried by the individual, the second sensor data generated independently of the first sensor data, the second sensor data describing at least one second physiological characteristic of the individual, wherein the first sensor data and the second sensor data are accessed in response to a request of the individual to access information through the kiosk;
        providing the first sensor data as input to a first classifier that is trained to predict pulse patterns based on a type of the first sensor device, and obtaining a first pulse pattern as output of the first classifier;
        providing the second sensor data as input to a second classifier, different from the first classifier, that is trained to predict pulse patterns based on a type of the second sensor device, and obtaining a second pulse pattern as output of the second classifier; and
        determining a degree of correspondence between the first pulse pattern and the second pulse pattern and, based at least partly on the degree of correspondence, determining a result of the request of the individual to access information through the kiosk.

9. The system of claim 8, wherein:
the first sensor device is at least one of a radar sensor device, a laser Doppler measurement device, and a laser vibrometer;
the first sensor data indicates movement of at least one body part of the individual, the movement associated with a pulse of the individual; and
analyzing the first sensor data includes extracting the first pulse pattern based on the movement indicated in the first sensor data.

10. The system of claim 8, wherein:
the first sensor device is a camera;
the first sensor data includes video of at least one body part of the individual; and
analyzing the first sensor data includes analyzing the video to determine the first pulse pattern based on one or more of a movement and a skin color fluctuation shown in the video.

11. The system of claim 8, wherein the determined result is a denial of access to the kiosk, based on an absence of a pulse in at least one of the first pulse pattern and the second pulse pattern.

12. The system of claim 8, wherein the determined result is a denial of access to the kiosk based on a difference, between the first pulse pattern and the second pulse pattern, in one or more of a frequency and a time offset of a pulse.

13. The system of claim 8, wherein the determined result is a grant of access to the kiosk based on the first pulse pattern being within a threshold degree of similarity to the second pulse pattern in both a frequency and a time offset of a pulse.

14. One or more non-transitory, computer-readable storage media storing instructions which, when executed, cause at least one processor to perform operations comprising:
accessing first sensor data generated by a first sensor device that is included in a kiosk, the first sensor data describing at least one first physiological characteristic of an individual;
accessing second sensor data generated by a second sensor device in proximity to the kiosk, the second sensor device included in a wearable device worn or carried by the individual, the second sensor data generated independently of the first sensor data, the second sensor data describing at least one second physiological characteristic of the individual, wherein the first sensor data and the second sensor data are accessed in response to a request of the individual to access information through the kiosk;
providing the first sensor data as input to a first classifier that is trained to predict pulse patterns based on a type of the first sensor device, and obtaining a first pulse pattern as output of the first classifier;
providing the second sensor data as input to a second classifier, different from the first classifier, that is trained to predict pulse patterns based on a type of the second sensor device, and obtaining a second pulse pattern as output of the second classifier; and
determining a degree of correspondence between the first pulse pattern and the second pulse pattern and, based at least partly on the degree of correspondence, determining a result of the request of the individual to access information through the kiosk.

15. The computer-implemented method of claim 1, wherein the first sensor device employs a first sensing method, and wherein the second sensor device employs a second, different sensing method.

* * * * *